No. 681,768. Patented Sept. 3, 1901.
G. T. WOODS.
REGULATING AND CONTROLLING ELECTRICAL TRANSLATING DEVICES.
(Application filed Jan. 14, 1895.)
(No Model.)
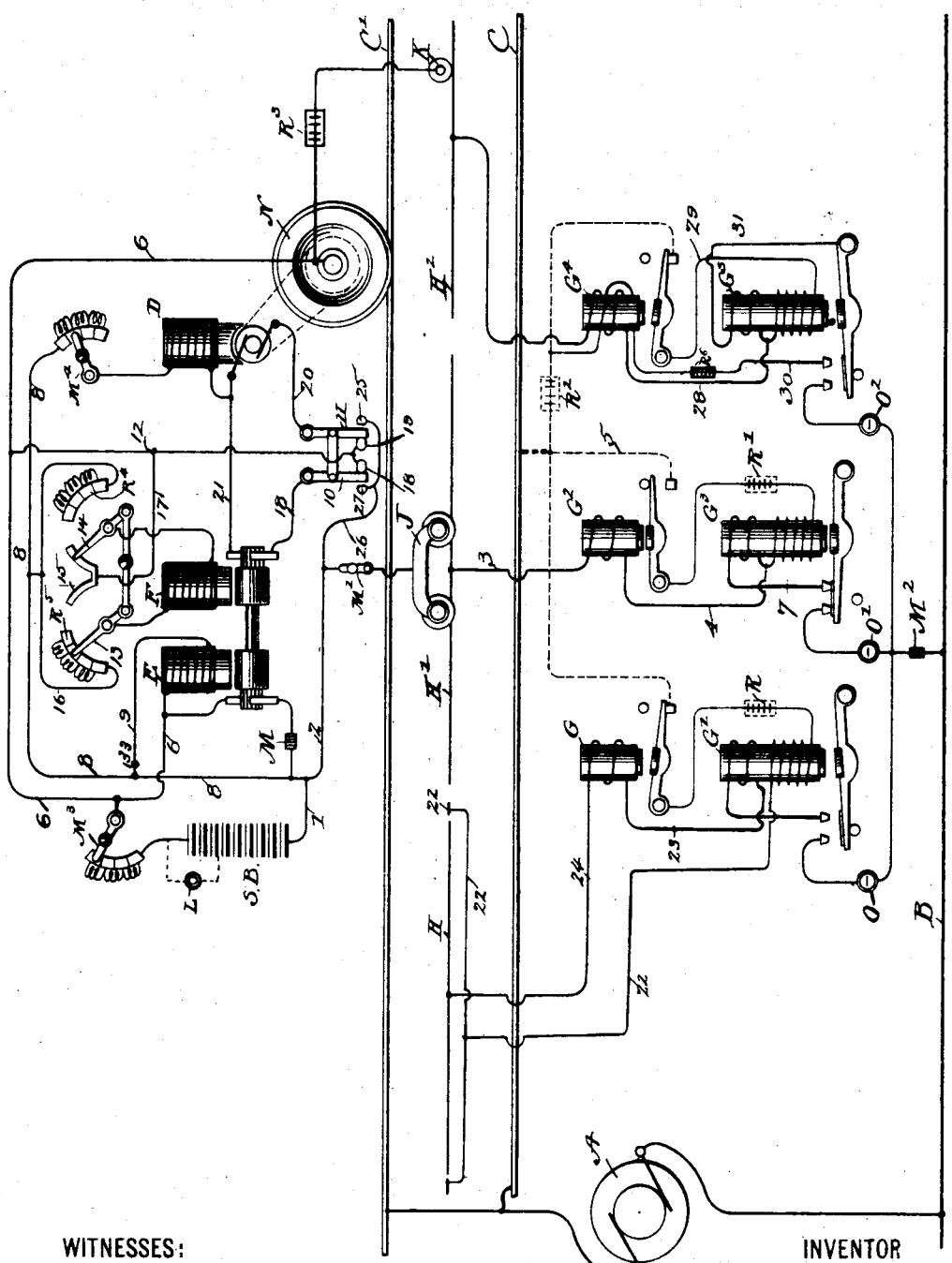
WITNESSES:
S. Woods.
R. Marks.
INVENTOR
G. T. Woods,

UNITED STATES PATENT OFFICE.

GRANVILLE T. WOODS, OF NEW YORK, N. Y., ASSIGNOR, BY MESNE ASSIGNMENTS, TO HARRY WARD LEONARD, OF EAST ORANGE, NEW JERSEY.

REGULATING AND CONTROLLING ELECTRICAL TRANSLATING DEVICES.

SPECIFICATION forming part of Letters Patent No. 681,768, dated September 3, 1901.

Application filed January 14, 1895. Serial No. 534,781. (No model.)

*To all whom it may concern:*

Be it known that I, GRANVILLE T. WOODS, a citizen of the United States, residing at New York, in the county and State of New York, have invented certain new and useful Improvements in Regulating and Controlling Electrical Translating Devices, of which the following is a full, clear, and exact description.

The object of the invention is to produce a safe and efficient means by which electric motors and their connections may be controlled and the waste of energy reduced to a minimum and the element of danger practically eliminated.

In regulating a motor which is employed to do work by means of a second motor or other suitable induction apparatus used as a regulator and placed in series with the armature of the working motor, so as to set up regulating electromotive force in the path of the current applied thereto, means must be provided whereby the electromotive force of the regulating device can be varied at will. This can be accomplished in several ways. If the regulating device is in the form of a dynamotor, this can be done in two ways, broadly distinguishable from each other. According to one method the motor-armature of the dynamotor is connected to the line in series with the armature of the working motor and the counter electromotive force of the motor-armature is controlled by controlling the output of the dynamo-armature of the dynamotor, thus controlling the speed of the armature-axis of the dynamotor. This method is disclosed in my application, Serial No. 444,268, filed August 27, 1892. According to the other method the electromotive-force-regulating armature of the dynamotor is connected to the line in series with the armature of the working motor and is caused to operate at a practically-constant speed by the other armature of the dynamotor. The electromotive force developed in the electromotive-force-regulating armature of the dynamotor, which is in series with the working motor, is then controlled by controlling its field. This method is disclosed in the present application. In speaking of the armatures of the dynamotor I shall call the one connected directly across the line the "shunt-armature" and the one connected in series with that of the working motor across the line the "series armature." These two methods both involve a single generic invention, which may be defined as the method of regulating and controlling electric power apparatus, consisting in supplying current from a conducting-line to two electrodynamic machines whose armatures are in series with each other, one being an electromotive-force-regulating armature and the other the armature of the working motor, and then regulating the speed of the working motor by varying the electromotive force of the armature in series with it, or, since the invention also consists in the apparatus used for carrying out these methods it may be stated that both of these methods involve the use of a broad mechanical invention which may be defined as a combination of an electric motor, an electromotive-force regulator consisting of a second dynamo-electric machine whose armature is in series with the motor to be regulated, and independent means for varying the electromotive force of the said second dynamo-electric machine.

In the accompanying drawing I have shown a diagrammatic view illustrating my invention applied to electric-railway cars or the like, the system of conductors being one in which sectional working conductors are exposed on the street-surface and are arranged parallel with the rails of the railway and provided with automatic devices for controlling the connection and disconnection progressively of the work-circuits to and from the feeder, the said devices being arranged in groups or sets of two or more and so placed as to be easily inspected; but the system of conductors forms no part of my present invention.

In the drawings A represents the main source of electrical energy.

B is the main feeder.

C C' are the rails of the railway, upon which the car moves and by which the current may be returned to the main source.

D is the working motor geared to car-wheels, (indicated by N.)

E is the dynamo-electric machine having the shunt-armature. F is the dynamo-electric machine having the series armature, said machines E and F when combined as shown constituting a dynamotor or electro converter.

G G', &c., are the electromagnetic devices (several modifications being shown) for controlling the work-circuits.

H H' H² are the sectional working conductors.

J is the main trolley, and K an auxiliary trolley.

L shows one or more lamps.

M M', &c., are electrical switches.

O O' O² are fuses.

R R', &c., are resistances, and SB is a storage battery.

When the series armature of the dynamotor and the armature of the working motor are connected in series with each other to the line in a branch which is in multiple with the branch containing the shunt armature of the dynamotor, the apparatus is then arranged for employing the method of controlling and regulating electric power apparatus, which consists in supplying current from the conducting-line to the armature of the working motor through an independent armature in series with it and then regulating the electromotive force of the said independent armature. The electromotive force of the regulating-armature is controllable, because the shunt-armature of the dynamotor is operated at a controllable speed and the field of the series armature of the dynamotor is controllable and reversible by means of a rheostat in series therewith.

The *modus operandi* of the apparatus is as follows: Suppose the car is standing over work-conductor H. To start the car, a current may be delivered from battery SB through wires 1 and 2, switch M', trolley J, conductor H', wire 3, magnet G², wire 4, fine coil of magnet G³, resistance R', armature of magnet G², its back-stop, wire 5 to the rails C C, car-wheel N, wire 6, switch M³, to battery. The armature of magnet G³ will then be drawn up to its front stop, thereby closing the circuit from feeder B through switch M², fuse O², the said front-stop, wire 7, coarse coil of magnet G³, to the junction of the coarse and fine coils of magnet G³, where the current divides, a small portion passing through the fine coil to the said rails. The major portion of the current then passes through wire 4, magnet G², wire 3, conductor H', trolley J, switch M', and wire 2. From this point the current again divides. One portion of the current passes through switch M, shunt-armature E, and wire 6 to rail C. The balance of the current passes through wire 8 to the point where wire 9 joins wire 8. Then the current again divides, a portion passing over wire 9 to the field-magnet of E, thence over wire 6 to rail C. The rest of the current then passes along wire 8 through rheostats to the field-magnet coils of machines F and D. From the field of machine F the circuits lead through wires 17 and 12 to conductor 6, and from the field of motor D it divides and passes through the armatures of machines D and F, thence through switches 10 and 11, contacts 18 and 19, and wire 12 to wire 6 and return-rail C. In the meantime the armature of magnet G² has been drawn from its back stop, thereby cutting off the ground through wire 5 and the armatures of machines E and F will have been set in motion. If we now move switch-levers 13 and 14 so that while one lever rests on contact-strip 15 the other will cut out some of the resistance R⁵, some current will then flow from wire 8, through wire 16, resistance R⁵, lever 13, around field-magnet of machine F to lever 14, thence through contact-strip 15, wire 17, wire 12, wire 6, to return-rail C. We will suppose that machine F is wound for a low voltage—say about one hundred and fifty volts—and that the resistance which was cut out caused F to generate, say, forty volts and sixty amperes. The current thus generated would flow from the armature of machine F over wire 18, switch 10, contacts 18 and 19, switch 11, wire 20, armature of machine D, wire 21 back to the armature of F. All the current passing through the field-magnet of motor D will flow through wire 2 in the direction of the current from the armature of F. The car will then start, say, toward work-conductor H. When trolley J touches auxiliary conductor 22, a small portion of current will be shunted through the conductor to the fine coil of magnet G', thence through resistance R and the armature of magnet G to rail C. The armature of magnet G' is then drawn against its front stops, thereby closing the circuit from feeder B through the coarse coil of magnet G', wire 23, magnet G, wire 24 to conductor H. As the car continues its motion trolley J reaches conductor H and opens the space between conductors H' and H, thereby beginning to take current from conductor H before breaking contact with H'. In the meantime the armature of magnet G has been drawn from its back stop, thereby cutting off the ground from the fine coil of magnet G'. After trolley J has passed over and broken contact with conductor 22 the current passing through the coarse coil of magnet G holds up its armature. The resistance R⁵ is gradually cut out of circuit, and the voltage of F increases until the limit is reached. Then switch 11 is made to connect with contact 25, thus cutting the armatures of machines D and F into the main circuit. Current will now flow through the various connections which are in circuit between the main feeder B and trolley J, thence through switch M', wire 26, contact 25, switch 11, wire 20, armature of machine D, wire 21, armature of machine F, wire 18, switch 10, contact 18, wire 12, wire 6 to return-rail C. It will be observed that the electromotive forces of main generator A and of machine F are thus thrown in series and that the counter electromotive force of motor D may be regulated by adjusting the polarity and amount of electromotive force of machine F. The duty of trolley K and its connections through resistance $R^3$ to wheel N is to complete a low-resistance circuit between the feeder and the return-conductor through any of the electromagnetic devices that fail to open the circuit after the car motive apparatus has ceased to draw energy therefrom. The circuit connections between trolley K and wheel N are of low resistance—say four times less resistance than the circuit from trolley J to wheel N. Trolley K is arranged at such a distance from trolley J that at no time will the two trolleys be on the same work-conductor, each work-conductor being about one-half the length of the car. Now if it is desired to reverse the movement of the car while trolley J is on working conductor H switch-levers 13 and 14 are moved into upright position, thus cutting them out of the circuit and demagnetizing the field of machine F. Switch 11 is then moved from contact 25 to contact 19. Switch-lever 14 is then moved to the right to place resistance $R^4$ in circuit, and lever 13 is moved into contact with strip 15. The current that then flows from wire 8 through levers 13 and 14 passes around the field-magnet of machine F in the opposite direction to that taken by the current formerly applied and the electromotive force now generated in its armature will be of the opposite polarity to that which had been generated therein when starting the car. This current flowing through the armature of motor D, whose field is charged in one direction only, will change the direction of the rotation of the motor-armature. As the car gains speed the resistance controlled by switch $M^4$ is cut out and the switch 10 is moved from contact 18 to contact 27, thus placing the main current in series with the current generated in the armature of machine F. The current from the main feeder then passes through switch M', wire 26, contact 27, switch 10, wire 18, armature of machine F, wire 21, armature of motor D, wire 20, switch 11, contact 19, wire 12, and wire 6 to wheel N and return-rail C. As the car moves in this direction trolley J will touch conductor $H^2$ before leaving conductor H' and a small portion of the current will pass through conductor $H^2$ to wire 32, thence around the coarse coil of magnet $G^4$, wire 28, fine coil of magnet $G^5$, wire 29, armature of magnet $G^4$ to resistance $R^2$, and rail C. The armature of magnet $G^5$ will then be drawn against its front stops, thus closing the circuit to feeder B. The current from feeder B will divide, a small part passing through wire 30 and fine coil of magnet $G^4$ to resistance $R^2$, and thence to rail C. The other part of the current will pass through the armature of magnet $G^5$, wire 31 to the coarse coil of magnet $G^5$, wire 28, coarse coil of magnet $G^4$, wire 32, conductor $H^2$ to trolley J, and thence to the apparatus on the car. In the meantime the armature of magnet $G^4$ is drawn from its back stop, thereby opening circuit 29, leading to rail C. The armature will be retained in that position by magnet $G^4$, energized by the current which passes through wire 30, until magnet $G^5$ is demagnetized and its armature leaves the front stops, which action breaks the circuit through wire 30 and the finer-wire coil of magnet $G^4$ and allowing the armature of magnet $G^4$ to return to its back stop.

I have discovered by experiment that the arrangement of the device which includes magnets $G^4$ and $G^5$ is more reliable than the arrangement which includes magnets $G^2$ and $G^3$, because the armature of magnet $G^3$ may be held for a short period after the current ceases to flow through the coils, and that would give the armature of magnet $G^2$ time to reach its back stop before the armature of magnet $G^4$ had moved. The circuit would then be closed from the main feeder through the fine coil of magnet $G^3$ to ground or rail C.

Another novel feature of my invention is that machine F may be wound or constructed so that it will generate, say, for example, two hundred and fifty volts, while the main source A gives three hundred volts, and the voltage of machine F may be used as a counter electromotive force by which the current from the feeder may be regulated while passing to the working motor D by operating machine F as a motor, which causes machine E to run as a generator supplying current to the main line.

To explain the mode of operation of the apparatus under the above conditions, let us suppose the car is standing over working conductor H and that current is passing from the feeder B to trolley J, switch M', wire 2, where the divisions take place, as previously described, a portion going to machine E to keep it in motion and a portion to charge the storage battery and a portion passing to motor D to charge its field-magnet. Switch-lever 13 is adjusted to cut all the resistance $R^5$ out of the circuit and lever 14 is moved onto contact 15, so that current from wire 8 passing to the field of machine F will fully charge it. Switch 10 before current is turned on is moved to a point about midway between contacts 18 and 27, while switch 11 is in connection with contact 19. Now as machine F is running and ready to produce current at its highest voltage the moment the circuit is closed and as the current from the armature of machine F will flow through wire 18 to switch 10 switch 10 will be moved onto contact 27, closing the circuit. Current from the feeder will instantly begin to flow through switch 10, wire 18, armature of machine F, wire 21, armature of motor D, wire 20, switch 11, contact 19, wires 12 and 6, thence to return-rail C. It is obvious that the current which now reaches motor D has a voltage which only represents the difference between the main current and the counter electromotive force of machine F. To increase the current delivered from the feeder to the working motor, switch-lever 13 is moved so that some of the resistance $R^5$ is cut into the field-circuit of machine F, thus cutting down the counter-current. As resistance is gradually cut into the field-circuit of machine F the speed of motor D is increased. When resistance $R^5$ is entirely in circuit, the polarity of electromotive generated by machine F may be reversed by moving switch 13 onto contact 15 and switch 14 to cut into the field-circuit the resistance $R^4$. The current now generated in its armature will flow in the same direction as and in series with the current from the main source, and as the resistance $R^4$ is cut out of the field-circuit the current will increase. To reverse the motion of the armature of motor D, resistance $R^5$ is cut out, and then switch 10 is moved from contact 27 to contact 18, thus cutting off the current from the feeder to the armature of motor D. Switch 11 is then moved to a position about midway between contacts 19 and 25. Then switch-levers 13 and 14 are moved, lever 13 into contact with strip 15 and lever 14 into contact with resistance $R^4$. All the resistance $R^4$ is then cut out of the circuit by continuing the movement of lever 14. Then switch 11 is moved onto contact 25, when the current from the feeder passes through contact 25, switch 11, wire 20, the armature of motor D, wire 21, the armature of machine F, wire 18, switch 10, wires 12 and 6, thence to return-rail C. In its path the current from the feeder met the full voltage of the counter-current from machine F. Resistance $R^4$ is now placed into the circuit again, thus cutting down the counter force generated, and after the circuit through the fields of machine F has been opened, switch-lever 14 to contact 15 and switch-lever 13 is moved into contact with resistance $R^5$, thereby causing the electroconverter to supply a force which flows in the same direction as and in series with the current from the feeder. When so desired, I may shift switch-levers 13 and 14 at once to a predetermined point along their paths and then regulate the speed of motor D by varying its counter electromotive force by adjusting switch $M^4$. The work done by motor D will then vary approximately proportionally to the variations of the counter electromotive force of motor D, thus allowing the electromotive force and the current of machine F to remain constant. If desirable, an adjustable resistance may be placed in the field-circuit of machine E at the point 33 in wire 9. It may also be desirable to put a resistance in wire 30 to cut down the current which flows through that wire at times, as previously described. Such a resistance is shown at $R^6$.

It will be observed that the field-magnets of machines D, E, and F are connected in multiple to the main source of supply, and the armatures of said machines are so arranged that they may also take current from the main source of supply, but independently of the field-magnets, except in case of machine D, whose field-magnet is in series with its armature. Therefore when the armature of motor D, which is to be regulated, and the armature of machine F are cut into the line they are in series in a branch which is connected to line in parallel with a branch containing the armature of machine E—that is, the armature of machine E is in a shunt with the line and the armature of machine F is in another shunt to the line and in series with the motor to be regulated.

The storage batteries may be of small capacity and may be used to propel the motor over crossings and switches. The battery as arranged would be constantly charged and therefore always ready for use. When the battery is used to propel the work-motor D, the manipulation of the switches may be the same as when the current from the main generator A is used, except that switch $M^3$ may be adjusted so as to cut out the resistance which it controls, thereby allowing the other regulators mentioned full control of the current. Storage battery SB may be of higher voltage than the main source and charged independent thereof. In such case machine E may be run independent of the main source of energy. The current from the battery would pass through wire 1, switch M, the armature of machine E, wire 6, to switch $M^3$ and the battery. The field of machine E would be charged through wires 8 and 9 and return through wire 6 to switch $M^3$ and the battery. If it should be found desirable at times to run motor D by battery SB without operating machines E and F, switch M must be opened. Then the field-magnet of motor D will be charged through wires 1 and 8 and switch $M^4$, the current returning by wires 12 and 6 to switch $M^3$ and the battery, current for the armature of motor D passing from the battery through wires 1, 2, and 26 to contacts 25 or 27, switches 10 and 11 being manipulated to send the current over either wires 18 or 20 to the armature. The current returning will pass through wires 12 and 6 to switch M and the battery.

I am aware that devices have been designed for indicating when a section of work-conductor is accidentally left alive by the failure of the magnetic devices to work; but I believe that I am the first to provide means for automatically cutting out any work-section and its controlling device in case of its failure to work properly.

In my present application I do not broadly claim the combination, with an electric motor, of a counter-electromotive-force regulator consisting of a second dynamo-electric machine whose armature is in series with the motor to be regulated and independent means for varying the counter electromotive force of the said second dynamo-electric machine; nor do I claim herein the method of controlling motors which consists in supplying to the motor a current of electricity, producing by magnetic induction in the circuit between the source of supply and the motor a varying magnetically-induced counter electromotive force independent of that of the motor and opposing the current of electricity supplied to the motor by varying the magnetically-induced counter electromotive force, as such a combination and method are broadly claimed in my said application, Serial No. 444,268, filed August 27, 1892; nor do I claim in this application the combination, with an electric motor, of a counter-electromotive-force regulator consisting of a dynamotor whose motor-armature is in shunt with the line and whose generator-armature is in shunt to the line and in series with the motor to be regulated; nor do I broadly claim the combination of an electric motor and an electromotive-force regulator consisting of a dynamo whose armature is in series with the armature of the motor and means for varying and reversing the electromotive force of the dynamo to regulate the motor, as such combinations are broadly claimed in my application Serial No. 542,457, filed March 20, 1895.

What I claim is—

1. The combination of an electric motor, a counter-electromotive-force regulator consisting of a dynamotor whose motor-armature is in shunt with the line and whose generator-armature is in another shunt to the line and in series with the armature of the motor to be regulated, the field of the motor to be regulated being connected between the line and the last-named shunt and being coupled in the said shunt between the armatures therein, substantially as described.

2. The combination of a source of constant potential, a shunt-wound motor in one branch therefrom, another branch therefrom containing in series the armature of an electric motor and a dynamo, the dynamo having a variable field and having its armature mechanically connected with the armature of the first-mentioned motor, and the field of the last-named motor being connected between the constant-potential source and the last-named branch therefrom, being coupled in the said branch between the armatures therein, substantially as described.

3. The combination of a source of electric energy, an electric motor, an electromotive-force regulator consisting of a dynamo whose armature is in series with the armature of the motor, the field of the motor being connected in series with its armature, and means for varying and reversing the electromotive force of the dynamo to regulate the motor, substantially as described.

4. The combination of a source of electric energy, an electric motor, an electromotive-force regulator consisting of a dynamo whose armature is in series with the armature of the motor to be regulated, the field of the motor to be regulated being connected in series with its armature, and means for reversing the field of the dynamo so that the current generated thereby can be thrown onto the line-circuit to aid or oppose the line-current, substantially as described.

5. The combination of a source of electric energy, an electric motor, and an electromotive-force regulator consisting of a dynamo whose armature is in series with the armature of the motor to be regulated, the field of the motor to be regulated being connected in series with its armature, and means for reversing the electromotive force of the dynamo and for reversing the motor, substantially as described.

6. The combination of a source of electric energy, an electric motor, an electromotive-force regulator consisting of a dynamo whose armature is in series with the armature of the motor to be regulated, the field of the motor to be regulated being connected in series with its armature, means for reversing the field of the dynamo, and means for reversing the motor, substantially as described.

7. The combination of a source of electric energy, an electric motor, an electromotive-force regulator consisting of a dynamo whose armature is in series with the armature of the motor to be regulated, the field of the motor to be regulated being connected in series with its armature, and means for reversing the motor, substantially as described.

8. The combination with a source of electric energy, of two electrodynamic machines whose armatures are in series with each other and whose fields are in multiple with each other, the field of one of the said machines being connected in series with its armature, means whereby the field of the last-named machine may be varied, and means for reversing the field of the other of the said machines, substantially as described.

9. The combination with a source of electric energy, of two electrodynamic machines whose armatures are in series with each other and whose fields are in multiple with each other, the field of one of the said machines being connected in series with its armature, and means for controlling the speed of said machine, substantially as described.

Signed at New York, in the county of New York and State of New York, this 31st day of August, A. D. 1891.

GRANVILLE T. WOODS.

Witnesses:
W. S. HANFORD,
S. WOODS.